US009499077B2

(12) United States Patent
Lamparter et al.

(10) Patent No.: US 9,499,077 B2
(45) Date of Patent: *Nov. 22, 2016

(54) ENERGY ABSORBING DEVICE FOR A VEHICLE

(71) Applicant: Survivability Solutions LLC, Sterling Heights, MI (US)

(72) Inventors: Ronald C. Lamparter, Grosse Pointe Shores, MI (US); Sorin Coman, Waterford, MI (US); Hugh S. McLeod, III, Clinton Township, MI (US)

(73) Assignee: SURVIVABILITY SOLUTIONS LLC, Sterling Heights, MI (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/266,909

(22) Filed: May 1, 2014

(65) Prior Publication Data
US 2015/0283925 A1    Oct. 8, 2015

Related U.S. Application Data

(63) Continuation of application No. 13/077,423, filed on Mar. 31, 2011, now Pat. No. 8,714,642.

(60) Provisional application No. 61/341,470, filed on Mar. 31, 2010.

(51) Int. Cl.
*B60N 2/42*    (2006.01)
*B60N 2/427*   (2006.01)
(Continued)

(52) U.S. Cl.
CPC ............. *B60N 2/42736* (2013.01); *B60N 2/24* (2013.01); *B60N 2/4242* (2013.01);
(Continued)

(58) Field of Classification Search
CPC .. B60N 2/42; B60N 2/4242; B60N 2/42709; B60N 2/42754
See application file for complete search history.

(56) References Cited

U.S. PATENT DOCUMENTS 2,459,948 A    1/1949   Lobelle
2,682,931 A *  7/1954   Young .......................... 188/374
(Continued)

FOREIGN PATENT DOCUMENTS

CA    2504928    10/2006
CA    2664435    10/2010
(Continued)

OTHER PUBLICATIONS

Christopher P. R. Hoppel, et al., "Apparatus for Absorbing Mine Blast Energy", U.S. Statutory Invention Registration, H1,833,Published Feb. 1, 2000, 15 pages.
(Continued)

*Primary Examiner* — Philip Gabler
(74) *Attorney, Agent, or Firm* — Howard & Howard Attorneys PLLC (57) ABSTRACT

A seat for supporting an occupant of a vehicle and absorbing a force between the occupant and the vehicle created by relative movement between the occupant and the vehicle including a seat bottom and a seat back extending from the seat bottom. At least one of the seat bottom and the seat back includes a first energy absorbing device for absorbing at least a portion of the force when the force reaches a first magnitude. The one of the seat bottom and the seat back also includes a second energy absorbing device for absorbing at least a portion of the force when the force reaches a second magnitude greater than the first magnitude. The second energy absorbing device supports the first energy absorbing device so that the first energy absorbing device transmits a portion of the force to the second energy absorbing device when the force reaches the second magnitude.

10 Claims, 9 Drawing Sheets

(51) Int. Cl.
*B60N 2/24* (2006.01)
*B60N 2/50* (2006.01)
*B60N 2/52* (2006.01)
*B60N 2/54* (2006.01)

(52) U.S. Cl.
CPC ......... *B60N 2/42709* (2013.01); *B60N 2/502* (2013.01); *B60N 2/503* (2013.01); *B60N 2/504* (2013.01); *B60N 2/506* (2013.01); *B60N 2/507* (2013.01); *B60N 2/525* (2013.01); *B60N 2/527* (2013.01); *B60N 2/548* (2013.01)

(56) References Cited

U.S. PATENT DOCUMENTS

| | | | | |
|---|---|---|---|---|
| 3,369,769 | A | 2/1968 | Burns | |
| 3,446,469 | A | 5/1969 | Whitten | |
| 3,493,211 | A | 2/1970 | Barecki et al. | |
| 3,532,379 | A * | 10/1970 | Gonsalves, Jr. et al. | 297/216.17 |
| 3,705,705 | A * | 12/1972 | Eggert, Jr. | 248/430 |
| 3,985,388 | A | 10/1976 | Hogan | |
| 4,087,118 | A | 5/1978 | Shimogawa et al. | |
| 4,128,217 | A | 12/1978 | Mazelsky | |
| 4,150,805 | A | 4/1979 | Mazelsky | |
| 4,204,659 | A * | 5/1980 | Phillips et al. | 248/562 |
| 4,257,626 | A | 3/1981 | Adomeit | |
| 4,408,738 | A | 10/1983 | Mazelsky | |
| 4,423,848 | A | 1/1984 | Mazelsky | |
| 4,487,383 | A | 12/1984 | Mazelsky | |
| 4,705,296 | A | 11/1987 | Andersson et al. | |
| 4,738,485 | A | 4/1988 | Rumpf | |
| 4,763,924 | A | 8/1988 | Karlin et al. | |
| 5,273,240 | A * | 12/1993 | Sharon | 244/122 R |
| 5,324,095 | A | 6/1994 | Yamauchi | |
| 5,370,446 | A | 12/1994 | Bancod | |
| 5,451,094 | A | 9/1995 | Templin et al. | |
| 5,642,916 | A | 7/1997 | Dybro et al. | |
| 5,758,859 | A * | 6/1998 | Gonzalez | 248/619 |
| 5,782,492 | A | 7/1998 | Ojima et al. | |
| 5,791,597 | A * | 8/1998 | Knoll | 244/121 |
| 5,813,649 | A * | 9/1998 | Peterson et al. | 248/618 |
| 5,836,647 | A | 11/1998 | Turman | |
| RE37,123 | E | 4/2001 | Templin et al. | |
| 6,267,440 | B1 | 7/2001 | Hoffman | |
| 6,322,140 | B1 | 11/2001 | Jessup et al. | |
| 6,394,393 | B1 | 5/2002 | Mort | |
| 6,450,449 | B1 * | 9/2002 | Podob et al. | 244/122 R |
| 6,520,541 | B1 | 2/2003 | Cantor | |
| 6,561,580 | B1 * | 5/2003 | Bergey | 297/216.1 |
| 6,582,015 | B2 | 6/2003 | Jessup et al. | |
| 6,585,190 | B2 | 7/2003 | Mort | |
| 6,755,465 | B2 * | 6/2004 | Yamaguchi et al. | 297/216.1 |
| 6,805,033 | B2 * | 10/2004 | Mauthe et al. | 89/36.01 |
| 6,820,931 | B2 * | 11/2004 | Ruff et al. | 297/216.17 |
| 6,908,149 | B1 * | 6/2005 | Yamaguchi et al. | 297/216.1 |
| 7,178,874 | B2 | 2/2007 | Demski | |
| 7,270,045 | B1 * | 9/2007 | Gonzalez | 89/36.02 |
| 7,293,818 | B2 * | 11/2007 | Kumpf et al. | 296/68.1 |
| 7,393,039 | B2 | 7/2008 | Ravid et al. | |
| 7,445,181 | B2 | 11/2008 | Knoll et al. | |
| 7,516,987 | B2 | 4/2009 | Koide et al. | |
| 7,533,924 | B2 * | 5/2009 | Ravid et al. | 296/68.1 |
| 7,744,155 | B2 | 6/2010 | List et al. | |
| 7,819,469 | B2 * | 10/2010 | Stevens | 297/216.13 |
| 7,822,522 | B2 * | 10/2010 | Wereley et al. | 701/45 |
| 7,883,135 | B2 | 2/2011 | Ravid et al. | |
| 7,926,769 | B2 | 4/2011 | Stenard | |
| 7,954,419 | B2 | 6/2011 | Ran et al. | |
| 8,016,258 | B1 | 9/2011 | Boyarski et al. | |
| 8,113,575 | B2 | 2/2012 | Masutani | |
| 8,146,988 | B2 | 4/2012 | Mowry et al. | |
| 8,182,044 | B2 | 5/2012 | Mullen | |
| 8,240,758 | B2 | 8/2012 | Combest | |
| 8,439,420 | B2 | 5/2013 | Cantor et al. | |
| 8,473,691 | B2 | 5/2013 | Masutani | |
| 8,469,400 | B2 | 6/2013 | Merrill et al. | |
| 8,469,401 | B2 | 6/2013 | Humbert et al. | |
| 8,714,642 | B2 | 5/2014 | Lamparter et al. | |
| 2003/0052229 | A1 * | 3/2003 | Mort | 244/122 R |
| 2006/0011781 | A1 * | 1/2006 | Knoll et al. | 244/122 R |
| 2007/0034768 | A1 * | 2/2007 | Stenard | 248/562 |
| 2008/0296946 | A1 * | 12/2008 | Reynolds et al. | 297/284.6 |
| 2009/0212160 | A1 * | 8/2009 | Beauchamp | 244/122 AG |
| 2009/0309346 | A1 | 12/2009 | Van Druff et al. | |
| 2010/0156153 | A1 * | 6/2010 | Gross et al. | 297/216.1 |
| 2010/0207433 | A1 | 8/2010 | Hahn | |
| 2010/0230989 | A1 | 9/2010 | Cantor et al. | |
| 2010/0270836 | A1 * | 10/2010 | Mowry et al. | 297/216.19 |
| 2010/0301647 | A1 * | 12/2010 | Carter et al. | 297/216.1 |
| 2012/0025570 | A1 | 2/2012 | Reinck | |
| 2013/0038099 | A1 | 2/2013 | Mindel et al. | |
| 2013/0214570 | A1 | 8/2013 | Grant et al. | |
| 2013/0229038 | A1 | 9/2013 | Marshall | |
| 2014/0216241 | A1 | 8/2014 | Lamparter et al. | |

FOREIGN PATENT DOCUMENTS

| | | |
|---|---|---|
| CN | 102390301 | 3/2012 |
| CN | 202200875 | 4/2012 |
| DE | 10130632 | 1/2003 |
| EP | 2000352 | 10/2008 |
| WO | 2010041235 | 4/2010 |
| WO | 2012066274 | 5/2012 |
| WO | 2013120142 | 8/2013 |

OTHER PUBLICATIONS

Machine-Assisted English Translation for DE 10130632 extracted from espacenet.com on Jul. 13, 2015, 12 pages.
Machine-Assisted English Translation for CN 102390301 extracted from espacenet.com on Jul. 13, 2015, 13 pages.
Machine-Assisted English Translation for CN 202200875 extracted from espacenet.com on Jul. 13, 2015, 13 pages.

* cited by examiner

ENERGY ABSORBING DEVICE FOR A VEHICLE

CROSS-REFERENCE TO RELATED APPLICATIONS

The subject patent application is a continuation of U.S. patent application Ser. No. 13/077,423, filed on Mar. 31, 2011, now U.S. Pat. No. 8,714,642, which in turn claims priority to and all the benefits of U.S. Provisional Patent Application No. 61/341,470, filed on Mar. 31, 2010, the entire specification of which is expressly incorporated herein by reference.

BACKGROUND OF THE INVENTION

1. Field of the Invention

The present invention relates to a seat for supporting an occupant of a vehicle and absorbing a force between the occupant and the vehicle created by relative movement between the occupant and the vehicle.

2. Description of the Related Art

Vehicles are widely used for military purposes, especially in recent military conflicts, to transfer soldiers, to enter combat areas, to patrol areas, etc. Such vehicles can be exposed to blasts resulting from an explosive such as an improvised explosive device, a mine, a grenade, etc. Forces from such blasts are transferred through the vehicle to the occupants. The vibration and/or reverberation of the blast through the vehicle can injure the occupants.

These vehicles can be armored to shield the occupants from such blasts but the armor of the armored vehicle is designed to remain rigid during a blast to deflect the blast and preserve the structural integrity of the vehicle, or at least the portion of the vehicle housing occupants. Unlike civilian automobiles that are designed to crush to absorb forces resulting from an automobile crash, the armor on the armored vehicle, due to its rigidity, does not crush and thus does not absorb forces resulting from the blast. As such, although the armor protects the occupants by maintaining structural rigidity of the vehicle, the blast vibrates and/or reverberates through the vehicle because the armor does not deform to absorb the energy of the blast. This vibration and/or reverberation through the vehicle can injure the occupant. For example, if the blast originates below the vehicle, the blast can vibrate and/or reverberate through the floor of the vehicle. In such a scenario, the occupant can be harmed if this vibration and/or reverberation is transferred directly to the occupant through the floor and/or the seat.

Further, whether the vehicle is armored or not, much of the technology for absorbing energy in a civilian automobile during an automobile accident is not suitable for absorbing energy from an explosive blast. As one example, conventional civilian automobiles are equipped with airbags that inflate upon crash of the automobile. The airbag can inflate within 5 milliseconds. Due to the speeds of typical civilian automobile accidents and/or due to the crushing of the automobile to absorb energy, the immediate need for inflation of the airbag is not necessary and the 5 millisecond delay is acceptable. In other words, in a civilian automobile accident, the inflation of the airbag is not needed earlier than 5 milliseconds after the crash. However, in the case of an explosive blast, the magnitude of the blast can be such that the forces of the blast are almost instantaneously transferred to the occupant, i.e., forces that can harm the occupant are transferred through the armored vehicle in less than 5 milliseconds. Further, in the case of an armored vehicle, for example, the armor is relatively rigid and does not absorb much, if any, forces. As such, much or all of the force resulting from the blast is transferred virtually instantaneously through the vehicle to the occupant. As such, the airbags used in civilian automobiles cannot react quickly enough due to the 5 millisecond delay associated with the civilian automobile airbags.

In addition to generating initial forces acting on the vehicle, the blast can also cause the vehicle to become airborne. The occupant can suffer injuries relating to the landing of the vehicle on the ground, i.e., the "slam down."

SUMMARY OF THE INVENTION AND ADVANTAGES

The present invention includes a seat for supporting an occupant of a vehicle and absorbing a force between the occupant and the vehicle created by relative movement between the occupant and the vehicle. The seat comprises a seat bottom and a seat back extending from the seat bottom. At least one of the seat bottom and the seat back includes a first energy absorbing device for absorbing at least a portion of the force when the force reaches a first magnitude. The one of the seat bottom and the seat back includes a second energy absorbing device for absorbing at least a portion of the force when the force reaches a second magnitude greater than the first magnitude. The second energy absorbing device supports the first energy absorbing device so that the first energy absorbing device transmits a portion of the force to the second energy absorbing device when the force reaches the second magnitude.

The first and second energy absorbing devices increase the overall range of forces that can be absorbed by the seat. In other words, the first energy absorbing device absorbs forces that are lower than forces absorbed by the second energy absorbing device and the second energy absorbing device absorbs forces that are higher than forces absorbed by the first energy absorbing device. Because the second energy absorbing device supports the first energy absorbing device, the second energy absorbing device absorbs at least a portion of the force when the first energy absorbing device ceases to absorb the force. In addition, the first and second energy absorbing devices can be individually tuned or sized to increase the range of forces absorbed by the seat.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
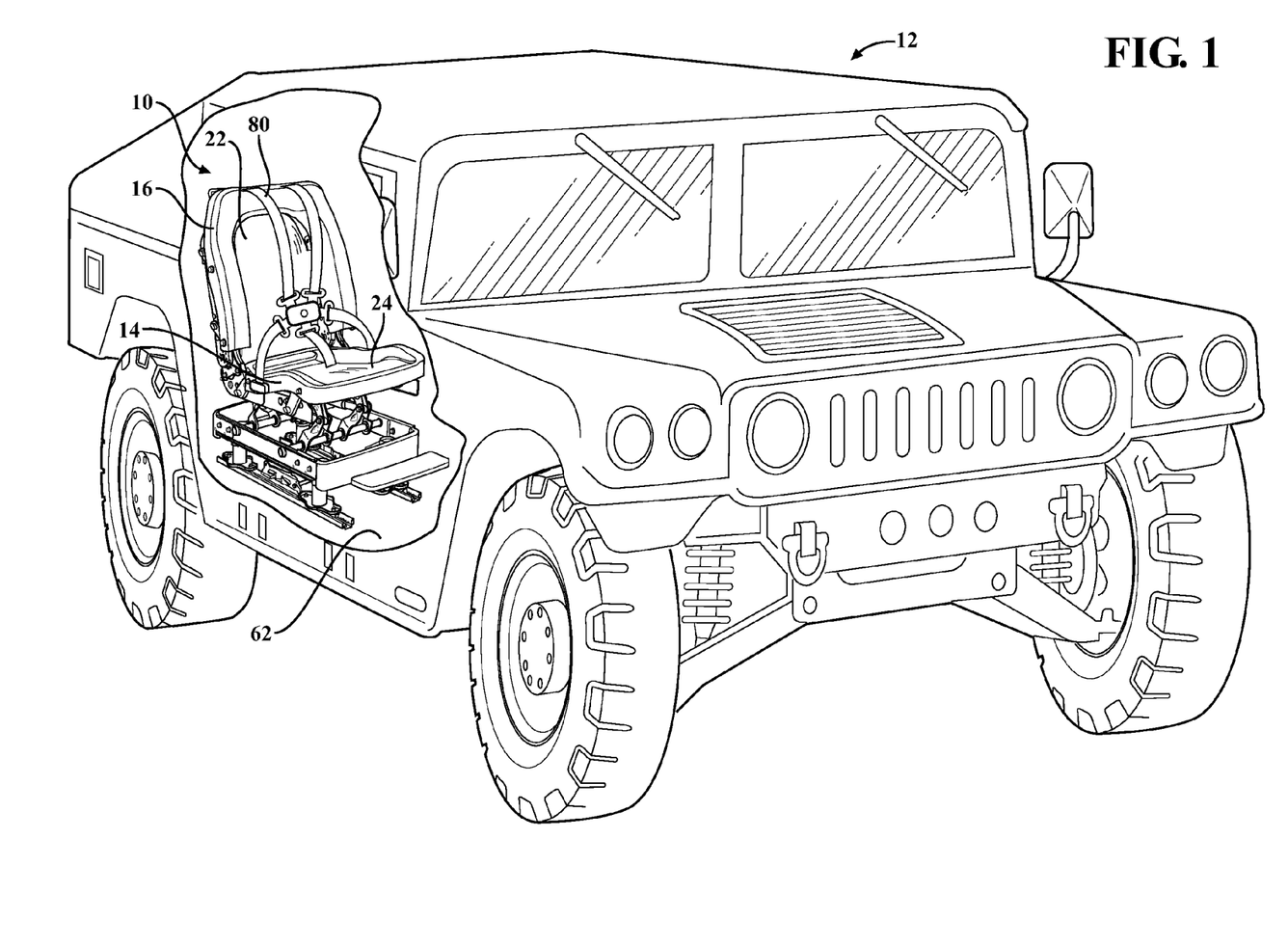
FIG. 1 is a perspective view of a vehicle partially cut away to show a seat in the vehicle.

Referring to the Figures, wherein like numerals indicate like parts throughout the several views, a blast attenuation seat is shown generally at 10 and is referred to hereinafter as "the seat 10." As shown in FIG. 1, the seat 10 is mounted in a vehicle 12 for supporting an occupant (not shown).

The seat 10 is typically mounted in a military vehicle but can also be mounted in a non-military vehicle such as, for example, a law enforcement vehicle or a civilian vehicle. Whether the vehicle 12 is a military vehicle or otherwise, the vehicle 12 can be a land vehicle such as, for example, an automobile, a tank, a bus, a train, etc.; a water vehicle such as, for example, a boat or a submarine; or an air vehicle such as, for example, an airplane or helicopter. Typical military uses of the seat 10 include, for example, armored vehicles and tanks.

The seat 10 supports the occupant of the vehicle 12 and absorbs a force between the occupant and the vehicle 12 created by relative movement between the occupant and the vehicle 12. Specifically, the seat 10 absorbs the force transmitted through the vehicle 12 to the seat 10 from a blast that originates exterior to the vehicle 12 in order to minimize force exerted through the seat 10 to the occupant. The blast can be caused by, for example, an explosive such as an improvised explosive device, a mine, a grenade, etc. The blast can result from an explosive in or on the ground or in the air around the vehicle 12. As one example, the blast can result from the vehicle 12 moving over a buried explosive. As set forth further below, the blast can also cause the vehicle 12 to become airborne and/or flip sideways, forward, and/or rearward, in which case the seat 10 not only absorbs the force resulting from the initial blast but also absorbs additional forces resulting from the impact of the vehicle 12 on the ground. In any event, regardless of the location of the explosive and the effect of the explosive on the vehicle 12, the seat 10 absorbs the force transmitted through the vehicle 12 to the seat 10.

Figure 2:
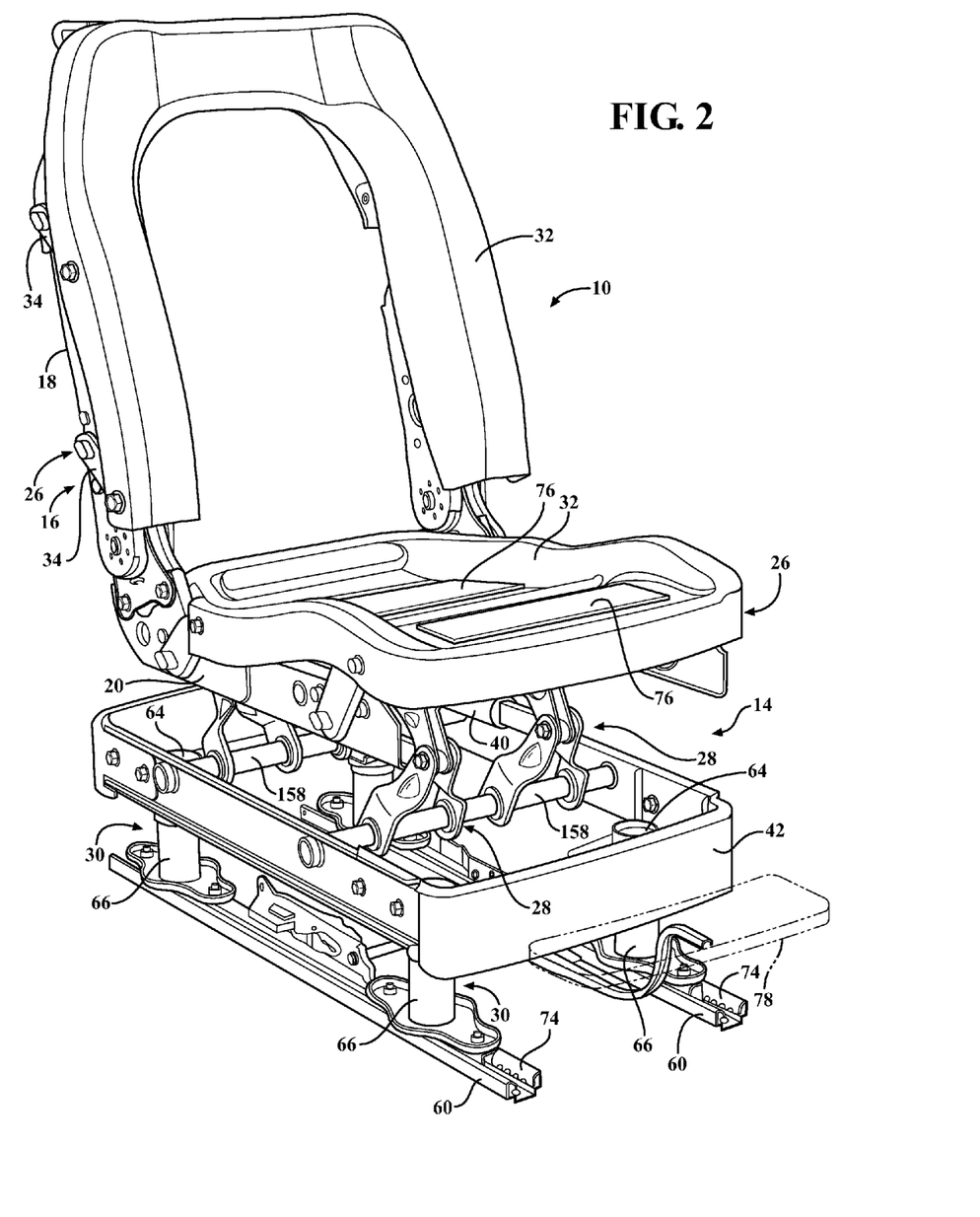
FIG. 2 is a front perspective view of a portion of the seat.
Figure 3:
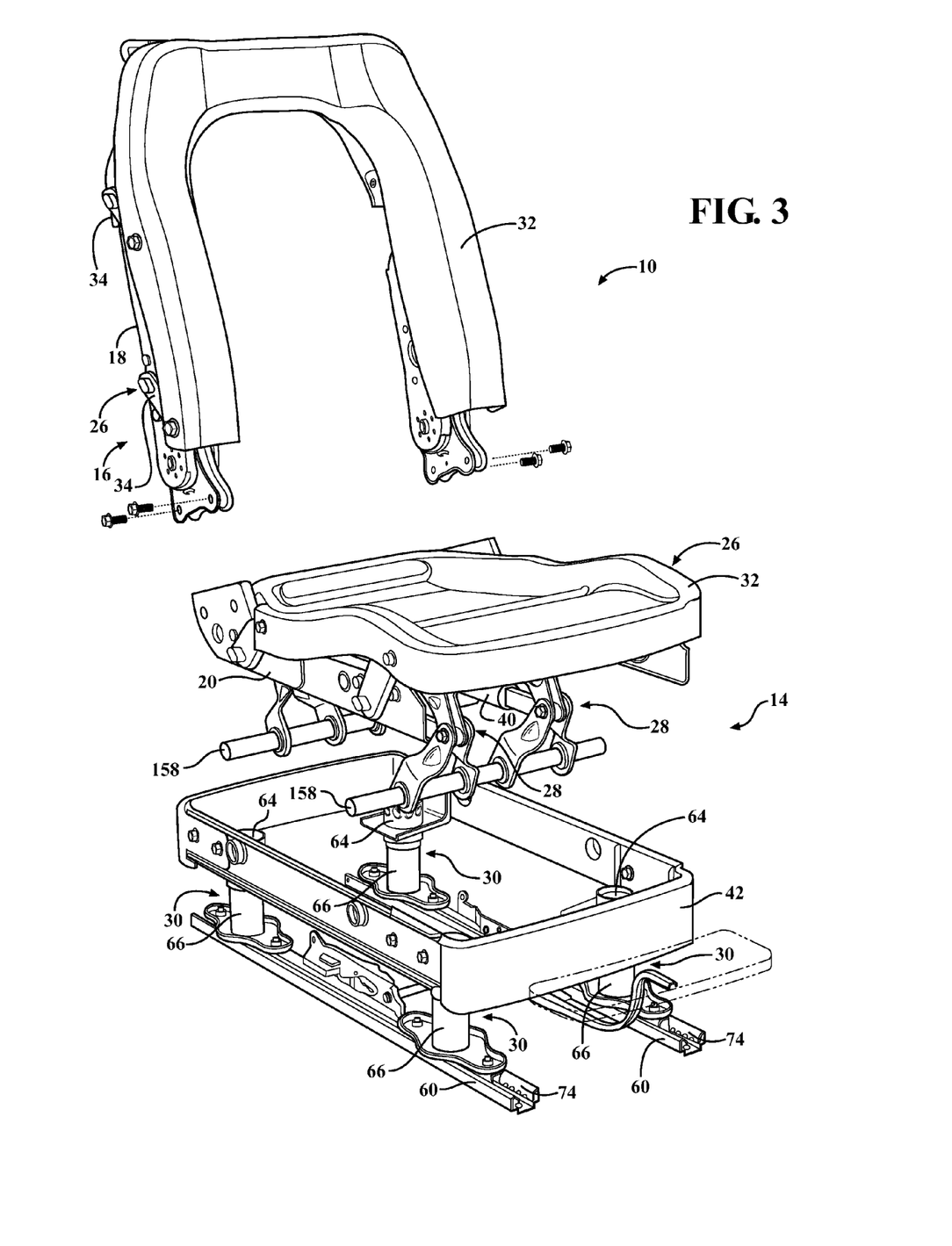
FIG. 3 is a partially exploded view of a portion of the seat.
Figure 4:
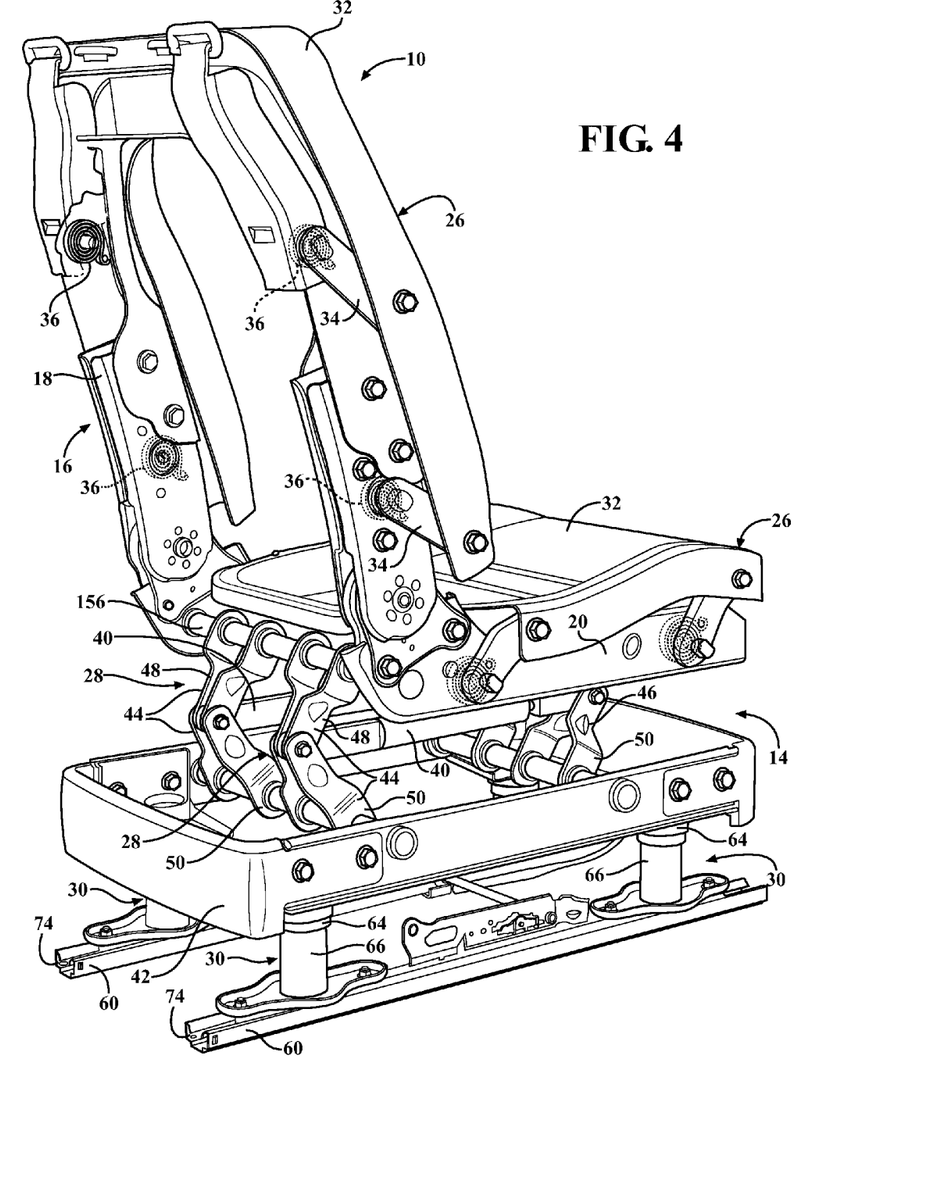
FIG. 4 is a rear perspective view of a portion of the seat.

With reference to FIGS. 2-4, the seat 10 includes a seat bottom 14 and a seat back 16 extending upwardly from the seat bottom 14. The seat back 16 includes a seat back frame 18 and the seat bottom 14 includes a seat bottom frame 20. Typically, the seat back frame 18 and the seat bottom frame 20 are formed of metal; however, it should be appreciated that the seat back frame 18 and the seat bottom frame 20 can be formed of any suitable material to provide proper support 42 for the occupant.

With reference again to FIG. 1, the seat back 16 can include a seat back cushion 22 mounted to the seat back frame 18 and the seat bottom 14 can include a seat bottom cushion 24 mounted to the seat bottom frame 20. The seat back cushion 22 and seat bottom cushion 24 are only partially shown in FIG. 1 and are not shown in FIGS. 2-4 and 6-9 for illustrative purposes. Specifically, the seat back cushion 22 and the seat bottom cushion 24 typically include foam (not shown) covered by fabric (not shown). The foam and fabric typically cover the seat back frame 18 and the seat bottom frame 20. The foam and the fabric of the seat back cushion 22 can be the same type of material or a different type of material than the foam and the fabric of the seat bottom cushion 24. When the force is exerted by the blast through the vehicle 12 to the seat 10, the foam compresses between the occupant and the seat bottom frame 20 and/or the seat back frame 18 to absorb at least a portion of the force to reduce or eliminate the magnitude of the force delivered to the occupant. The foam is typically resilient such that the foam returns to a pre-blast configuration after absorbing the force from the blast.

With reference again to FIGS. 2-4, the seat bottom 14 includes a first energy absorbing device 26, a second energy absorbing device 28, and a third energy absorbing device 30. As set forth further below, the first 26, second 28, and/or third 30 energy absorbing devices allow movement of at least one of the seat bottom 14 and the seat back 16 relative to the vehicle 12 in response to the force of the blast and absorb at least a portion of the force. The first 26, second 28, and third 30 energy absorbing devices are active, i.e., instantaneously respond to force. The seat 10 is tunable in that the first 26, second 28, and third 30 energy absorbing devices can each be designed so that, in combination, the first 26, second 28, and third 30 energy absorbing devices can absorb energy over a large range of forces.

At least one of the seat bottom 14 and the seat back 16 includes the first energy absorbing device 26 for absorbing at least a portion of the force of the blast when a magnitude of the force reaches a first magnitude F1. As shown in the FIGS. 2-4, both the seat bottom 14 and the seat back 16 include first energy absorbing devices 26. The first energy absorbing device 26 of the seat back 16 and the seat bottom 14 is typically disposed beneath the seat back cushion 22 and the seat bottom cushion 24, respectively. In other words, the foam and fabric of the seat back cushion 22 and the seat bottom cushion 24 covers the first energy absorbing device of the seat bottom 14 and the seat back 16, respectively. As set forth above, the foam and fabric of the seat back cushion 22 and the seat bottom cushion 24 is not shown in the Figures in order to show the other features of the seat 10.

At least one of the seat bottom 14 and the seat back 16 also typically includes the second energy absorbing device 28 for absorbing at least a portion of the force of the blast when a magnitude of the force reaches a second magnitude F2 greater than the first magnitude F1 and a third energy absorbing device 30 for absorbing for absorbing at least a portion of the force when a magnitude of the force exceeds a third magnitude F3 greater than the second magnitude F2. As shown in FIGS. 2-4, the seat bottom 14 includes the second energy absorbing device 28 and the third energy absorbing device 30. It should be appreciated that the, while not shown in the Figures, the seat back 16 can include the second 28 and third 30 energy absorbing devices.

Figure 6:
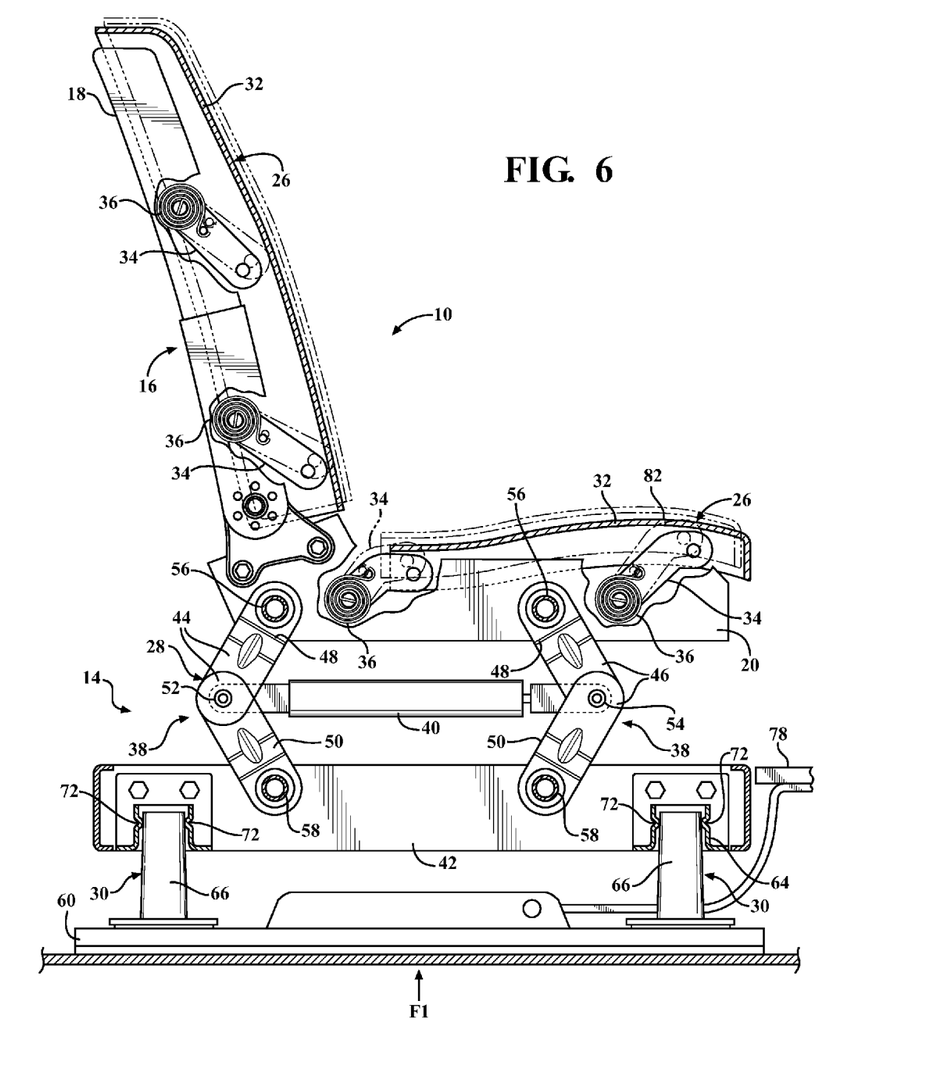
FIG. 6 is a sectional and partial cut-away view of the seat when a force of a first magnitude is applied to the seat.
Figure 7:
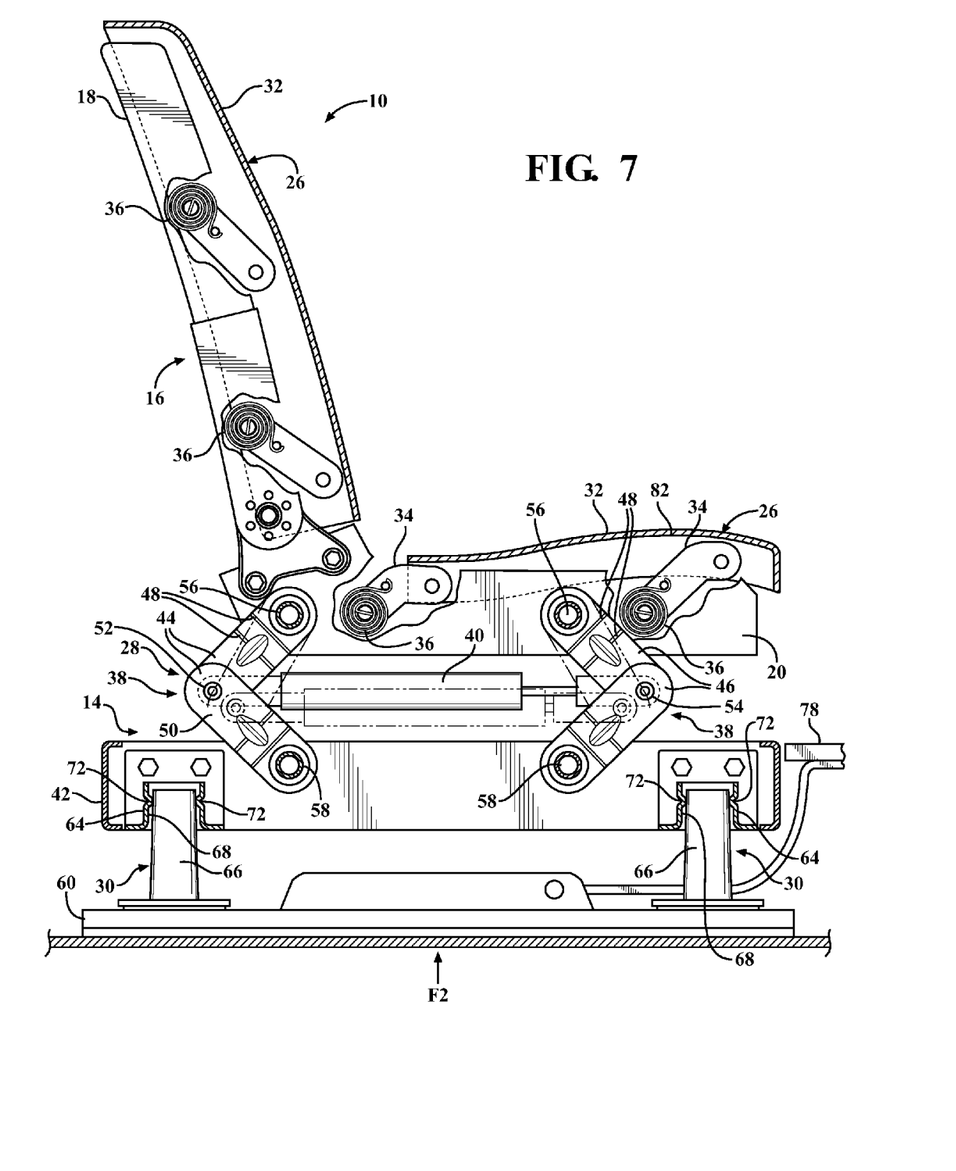
FIG. 7 is a sectional and partial cut-away view of the seat when a force of a second magnitude is applied to the seat.
Figure 8:
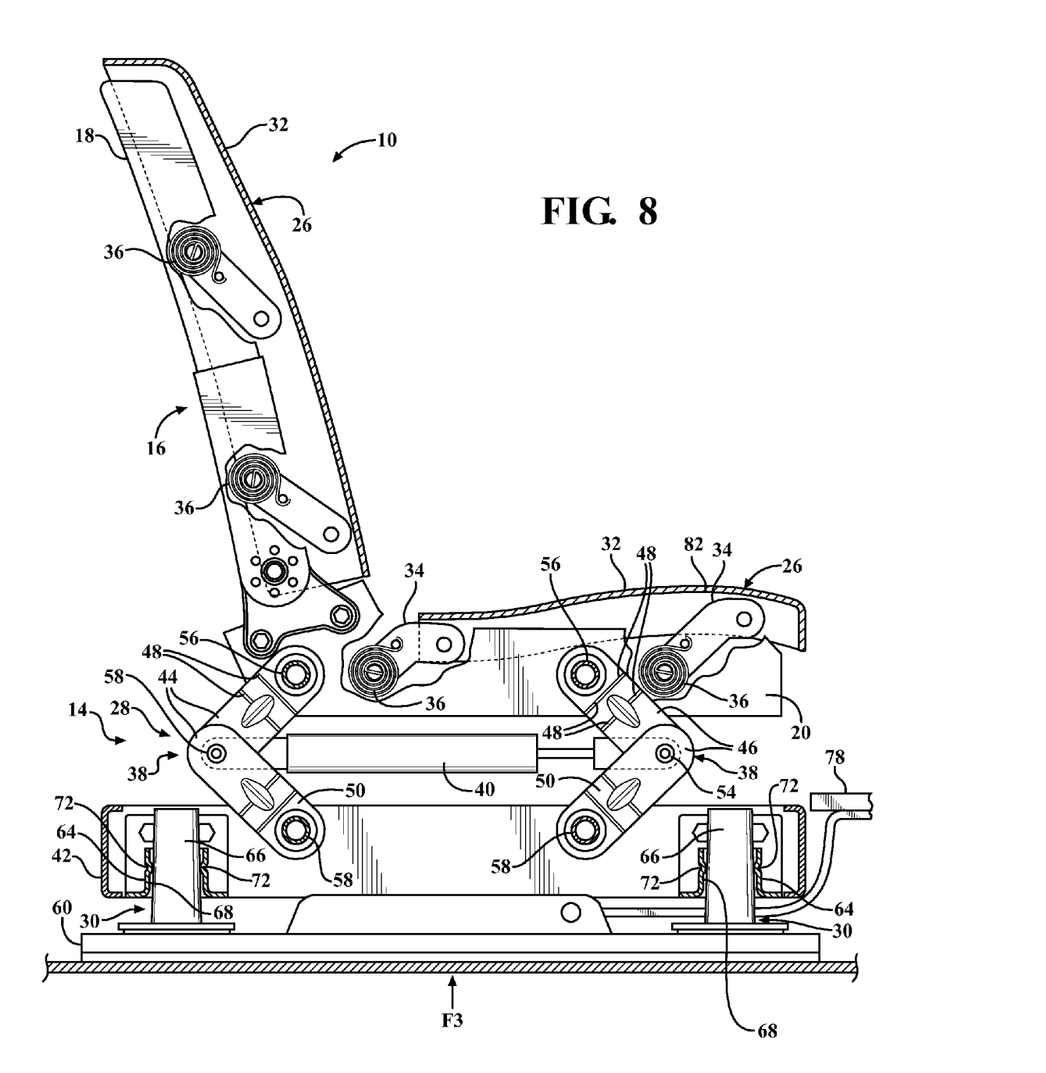
FIG. 8 is a sectional and partial cut-away view of the seat when a force of the third magnitude is applied to the seat.

FIGS. 6-8 show the seat 10 reacting to the forces of the first magnitude F1, second magnitude F2, and third magnitude F3, respectively. The first 26, second 28, and third 30 energy absorbing devices can be designed such that the first magnitude F1, the second magnitude F2, and the third magnitude F3 can have any numerical measurement or range of numerical measurements. For example, the first magnitude F1 of the force, i.e., the magnitude that activates the first energy absorbing device 26, is typically between 15 and 100 G. The second magnitude F2 of the force, i.e., the magnitude that activates the second energy absorbing device 28, is typically 100 and 300 G. The third magnitude F3 of the force, i.e., the magnitude that activates the third energy absorbing device 30, typically has a magnitude of between 300 and 550 G.

The first 26, second 28, and third 30 energy absorbing devices are arranged to function in series. In other words, the first 26, second 28, and third 30 energy absorbing devices 30 each respectively absorb progressively larger forces. Said differently, if the force exceeds the range of the first energy absorbing device 26, the first energy absorbing device 26 absorbs a portion of the force and transfers a portion of the force to the second energy absorbing device 28. Likewise, if the force exceeds the range of the second energy absorbing device 28, the first 26 and second 28 energy absorbing devices absorb a portion of the force and the second energy absorbing device 28 transfers a portion of the force to the third energy absorbing device 30.

The first energy absorbing device 26 is configured to absorb at least a portion of the force when the force reaches the first magnitude F1, i.e., during a blast, the first energy absorbing device 26 is activated and absorbs at least a portion of the force when the force reaches the first magnitude F1. If, on the other hand, the force is smaller than the first magnitude F1, then the first energy absorbing device 26 remains deactivated and does not absorb any of the force. The first energy absorbing device 26 can be loaded to a completely loaded state, in which state the first energy absorbing device 26 does not absorb additional force. Typically, the first energy absorbing device 26 reaches the fully loaded state at a magnitude of the force at least as high as the second magnitude F2.

The second energy absorbing device 28 is configured to absorb at least a portion of the force when the magnitude of the force reaches the second magnitude F2. If the force exceeds the second magnitude F2 and the first energy absorbing device 26 reaches the completely loaded state, the second energy absorbing device 28 is activated and, in addition to the activation of the first energy absorbing device 26, absorbs at least a portion of the force. If, on the other hand, the force remains smaller than the second magnitude F2, then the second energy absorbing device 28 remains deactivated and does not absorb any of the force. The second energy absorbing device 28 can be loaded to a completely loaded state, in which state the second energy absorbing device 28 does not absorb additional force. Typically, the second energy absorbing device 28 reaches the fully loaded state at a magnitude of the force at least as high as the third magnitude F3.

The third energy absorbing device 30 is configured to absorb at least a portion of the force when the force reaches the third magnitude F3. If the force exceeds the third magnitude F3 and the second energy absorbing device 28 reaches the completely loaded state, the third energy absorbing device 30 is activated and, in addition to the activation of the first 26 and second 28 energy absorbing devices, absorbs at least a portion of the force. If, on the other hand, the force remains smaller than the third magnitude F3, then the third energy absorbing device 30 remains deactivated and does not absorb any of the force.

With reference to FIGS. 2-4, the first energy absorbing device 26 includes a frame, such as the seat bottom frame 20 or the seat back frame 18, and a pan 32 spaced from the frame 18, 20. The pan 32 is typically connected to the frame 18, 20 with at least two links 34 that are each pivotally connected to the frame 18, 20 and the pan 32. Alternatively, the pan 32 can be moveably connected to the frame 18, 20 in any suitable fashion.

With reference to FIG. 4, a first resilient member 36 is disposed between the frame 18, 20 and the pan 32 to urge the pan 32 away from the frame 18, 20. Specifically, any number of first resilient members 36 can be disposed between the frame 18, 20 and the pan 32. The first resilient member 36 can be, for example, a torsion spring, a coil spring, a hydraulic damper, a pneumatic damper, etc.

With reference to FIG. 6, the first resilient member 36 is designed to maintain the pan 32 in position relative to the frame 18, 20 until the force reaches the first magnitude F1. In other words, in the absence of a force of the first magnitude F1, e.g., from a blast, the pan 32 does not move to support 42 the occupant without loading the first resilient member 36, as shown in phantom lines in FIG. 6. When the force reaches or exceeds the first magnitude F1, the force overcomes the first resilient member 36 and begins to load the first resilient member 36. As the force overcomes the first resilient member 36, the pan 32 moves relative to the frame 18, 20, as shown in solid lines in FIG. 6.

The first energy absorbing device 26 resiliently moves when absorbing at least a portion of the force. As such, as the force resides, the first energy absorbing device 26 returns to a pre-force position. In other words, the pan 32 and the first resilient member 36 return to a position that the pan 32 and the first resilient member 36 had before the force was applied, i.e., the position shown in phantom lines in FIG. 6.

With reference again to FIGS. 2-4, the second energy absorbing device 28 includes a linkage 38 and a second resilient member 40 operatively coupled to the linkage 38. The second resilient member 40 can be, for example, a shock absorber including a cylinder and a piston telescopically received in the cylinder. Such a shock absorber can be, for example, hydraulically or pneumatically operated. It should be appreciated that the second resilient member 40 can be of any suitable type without departing from the nature of the present invention.

A support 42 is spaced from the seat bottom frame 20 and the second energy absorbing device 28 is coupled to the seat bottom frame 20 and the support 42. Specifically, the linkage 38 is coupled to the frame 18, 20 and the support 42 and a second resilient member 40 is operatively coupled to the linkage 38. The seat 10 can include any number of second energy absorbing devices 28. For example, as shown in FIGS. 2-4, the seat 10 has two second energy absorbing devices 28.

With reference to FIG. 7, the linkage 38 includes a first pair of links 44 and a second pair of links 46 with the second resilient member 40 extending between the first pair of links 44 and the second pair of links 46. Each of the first 44 and second 46 pair of links includes an upper link 48 pivotally coupled to the seat bottom frame 20 and a lower link 50 pivotally coupled to the support 42. The upper 48 and lower 50 links of the first pair of links 44 are pivotally coupled to each other at a joint 52 and the upper 48 and lower 50 links of the second pair of links 46 are pivotally coupled to each other at a joint 54.

The linkages 38 of the two second energy absorbing devices 28 can be connected to each other such that the second energy absorbing devices 28 are arranged in parallel, as shown in the Figures, or in series (not shown). For example, the seat 10 can include upper cross members 56 that connect the upper links 48 of the second energy absorbing members 28 together and lower cross members 58 that connect the lower links 50 of the second energy absorbing members 28 together, as shown in FIGS. 2-4.

The upper cross members 56 and lower cross members 58 interconnect the two second energy absorbing devices 28 to the seat bottom frame 20 and the support 42 so that that the second energy absorbing devices 28 work together in a balanced fashion. This arrangement prevents twisting of the seat 10 when the second energy absorbing devices 28 are loaded.

The upper cross members 56 extend from the upper links 48 to the seat bottom frame 20 to couple the upper links 48 with the seat bottom frame 20. The upper cross members 56 typically extend through the upper links 48 and through the seat bottom frame 20 and each upper cross member 56 is pivotally coupled to at least one of the upper link 48 and the seat bottom frame 20. The lower cross members 58 extend from the lower link 50 to the support 42 to couple the lower link 50 to the support 42. The lower cross members 58 typically extend through the lower link 50 and through the support 42 and each lower cross member 58 is pivotally coupled to at least one of the lower link 50 and the support 42.

The second resilient member 40 is connected to and extends between the first and second pairs of links 34. Typically, the second resilient member 40 extends from the joint 52 of the first pair of links 44 to the joint 54 of the second pair of links 46. Alternatively, the second resilient member 40 can be connected to the upper link 48 or the lower link 50 of the first and/or second pairs of links 34.

The second resilient member 40 is designed to maintain the seat bottom frame 20 in position relative to the support 42 until the force reaches the second magnitude F2. In other words, in the absence of a force of a second magnitude F2, e.g., from a blast, the seat bottom frame 20 does not move and supports the occupant without loading the second resilient members 40, as shown in FIG. 6. As shown in FIG. 7, when the force reaches or exceeds the second magnitude F2, the force overcomes the second resilient members 40 and begins to load the second resilient members 40. As the force overcomes the second resilient member 40, the seat bottom frame 20 moves relative to the support 42.

During a blast, force is transmitted through the seat 10 to the first and second pair of links 46. This force urges the upper 48 and lower 50 links to pivot about the joints, respectively. The second energy absorbing device 28 is configured such that, if a force of the second magnitude F2 is applied to the seat 10, the force on the upper 48 and lower 50 links overcome the second resilient member 40 such that the upper 48 and lower 50 links pivot about the joints 52, 54, respectively. In other words, the upper 48 and lower 50 links move in a scissor-like motion. The blast causes the first 44 and second 46 pair of links to pull the second energy absorbing device 28 in tension.

The second energy absorbing device 28 resiliently moves when absorbing at least a portion of the force. As such, as the force resides, the second energy absorbing device 28 returns to a pre-force position. In other words, the seat bottom frame 20 returns to a position that the seat bottom frame 20 had before the force was applied, i.e., as shown in FIG. 6.

The second energy absorbing device 28 extends between the first energy absorbing device 26 and the third energy absorbing device 30. The second energy absorbing device 28 supports the first energy absorbing device 26. Specifically, the second energy absorbing device 28 supports the seat bottom frame 20 so that the first energy absorbing device 26 transmits a portion of the force to the second energy absorbing device 28 when the force exceeds the first magnitude F1. In other words, the second energy absorbing device 28 acts as a foundation for the first energy absorbing device 26. As set forth above, when the magnitude of the force is less than the second magnitude F2, the second energy absorbing device 28 remains deactivated and the seat bottom frame 20 maintains position relative to the support 42, as shown in FIG. 6. If the magnitude of the force loads the first energy absorbing device 26 to the fully loaded state, i.e., a force greater than the second magnitude F2, the first energy absorbing device 26 is unable to absorb additional force and instead transmits additional force to the second energy absorbing device 28.

With reference again to FIGS. 2-4, the seat 10 includes a base 60 for connecting to the vehicle 12. The base 60 is mounted to the vehicle 12, and particularly, for example, to a floor 62 of the vehicle 12. Alternatively or in addition, the base 60 can be mounted to another part of the vehicle 12 such as, for example, an interior side of the vehicle 12.

With reference to FIG. 8, the third energy absorbing device 30 includes a cup 64 attached to one of the base 60 and the support 42 and a rod 66 attached to the other of the base 60 and the support 42. For example, as shown in FIG. 8, the cup 64 is connected to the support 42 and the rod 66 extends from the base 60 upwardly into the cup 64. The cup 64 includes an interior wall 68 that defines a cavity 70 receiving the rod 66. The rod 66 abuts the interior wall 68. The interior wall 68 can include protrusions 72 that extend into the cavity 70 and abut the rod 66. The rod 66 tapers from the base 60 toward the protrusions 72.

Figure 5A:
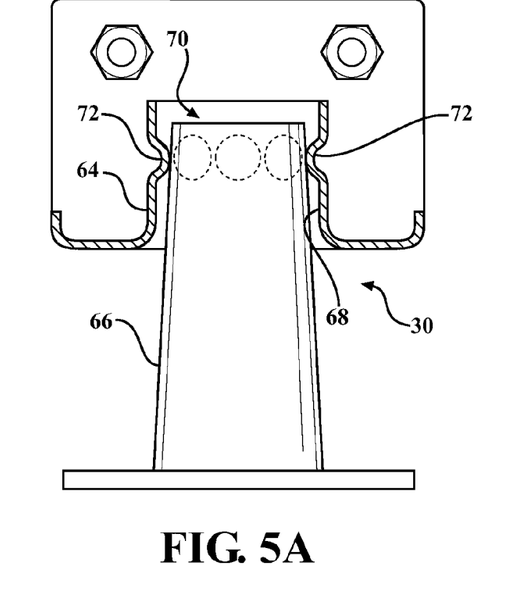
FIG. 5A is a side view of a third energy absorbing device of the seat when no force or a force less than a third magnitude is applied to the seat.

The third energy absorbing device 30 is designed to maintain the support 42 in position relative to the base 60 until the force reaches the third magnitude F3. In other words, in the absence of a force of the third magnitude F3, e.g., from a blast, the support 42 does not move and supports the occupant, as shown in FIG. 7. The relative position of the rod 66 and the cup 64 of FIG. 7 is shown in greater detail in FIG. 5A. When the force reaches or exceeds the third magnitude F3, the force overcomes the third energy absorbing device 30. As the force overcomes the third energy absorbing device 30, the support 42 moves toward the base 60 as shown in FIG. 8. The relative position of the rod 66 and the cup 64 of FIG. 8 is shown in greater detail in FIG. 5B.

Figure 5B:
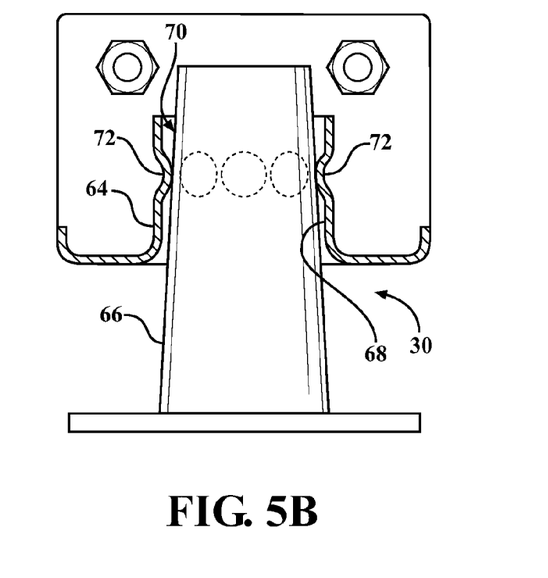
FIG. 5B is a side view of the third energy absorbing device when a force on the seat exceeds the third magnitude.

Specifically, when the force reaches the third magnitude F3, the rod 66 is forced deeper into the cavity 70 and the rod 66 and/or the protrusions 72 plastically deform to absorb at least a portion of the force, as shown in FIG. 5B and FIG. 8. After the blast, the third energy absorbing device 30 is typically replaced since the rod 66 and/or the protrusions 72 are plastically deformed.

The rod 66 and the cup 64 are typically formed of steel. Alternatively, the rod 66 and cup 64 can be formed of any type of material suitable for deform to absorb energy.

The third energy absorbing device 30 extends between the base 60 and the second energy absorbing device 28. The third energy absorbing device 30 supports the second energy absorbing device 28. Specifically, the third energy absorbing device 30 supports the support 42 so that the second energy absorbing device 28 transmits a portion of the force to the third energy absorbing device 30 when the force exceeds the second magnitude F2. In other words, the third energy absorbing device 30 acts as a foundation for the second energy absorbing device 28. As set forth above, when the magnitude of the force is less than the third magnitude F3, the third energy absorbing device 30 remains stationary and the support 42 maintains position relative to the base 60, as shown in FIG. 7. If the magnitude of the force loads the second energy absorbing device 28 to the fully loaded state, i.e., a force greater than the third magnitude F3, the second energy absorbing device 28 is unable to absorb additional force and instead transmits additional force to the third energy absorbing device 30.

The base 60 is typically mechanically fastened to the vehicle 12 with mechanical fasteners (not shown) such as, for example, threaded bolts so that the base 60 can be easily replaced by merely unfastening the mechanical fasteners.

The base 60 defines a track 74 and the third energy absorbing device 30, e.g., the rod 66, is slideably disposed in the track 74. As such, a position of the seat 10 can be adjusted along the base 60.

With reference again to FIGS. 2-4, the seat 10 can include one or more bases 60 and one or more third energy absorbing devices 30. For example, in FIGS. 2-4, the seat 10 includes two bases 60 and four third energy absorbing devices 30. Two third energy absorbing devices 30 are mounted to each base 60. In such a configuration, the multiple third energy absorbing devices 30 evenly distribute the force to the second 28 and first 26 energy absorbing devices.

The bases support 42 the rest of the seat 10 in the vehicle 12 such that the seat 10 is modular, i.e., self contained. The entire seat 10 can be installed into or removed from the vehicle 12 by merely disconnecting the bases 60 from the vehicle 12. This modular arrangement also allows for one or more seats 10 to be easily installed in various seating configurations in the vehicle 12. In addition, the seat 10 can be easily removed from the vehicle 12 for replacement or service.

As set forth above, the blast may cause the vehicle 12 to become airborne, which results in an event called a "slam down" when the vehicle 12 lands. As shown in FIG. 2, the seat 10 can include an inflatable device 76 such as, for example, an airbag to cushion the occupant on the slam down. In other words, the inflatable device 76 increases the "ride down time." As set forth above, the first 26 and second 28 energy absorbing devices are resilient and, as such, the first 26 and second 28 energy absorbing devices can reset before the slam down. The inflatable device 76 can aid the reset first 26 and second 28 energy absorbing devices on slam down. The inflatable device 76 can also provide the primary energy absorption in the event that the first and/or second energy absorbing device 28 do not reset before the slam down.

The inflatable device 76 can be, for example, disposed on the pan 32 of the seat bottom 14 and/or the seat back 16 and is configured to selectively inflate for cushioning between the occupant and the pan 32. The inflatable device 76 is configured to inflate when the vehicle 12 is airborne so that the inflatable device 76 can immediately absorb energy when the vehicle 12 lands. The inflatable device 76 can also be positioned on the pan 32 to prevent "submarining" of the occupant as discussed further below. The inflatable device 76 includes a bag that is typically formed of a shrapnel-resistant material such as, for example, Nomex and/or Kevlar.

The inflatable device 76 can include, for example, a computer (not shown) having a sensor for sensing the blast and inflating the inflatable device 76. The computer can be programmed such that, for example, the inflation of the inflatable device 76 can be delayed so that the inflatable device 76 does not interfere with the energy absorption of the first 26, second 28, and third 30 energy absorbing devices. After the initial delay, the inflatable device 76 is inflated before the vehicle 12 lands. For example, the computer can be programmed such that the airbag inflates 25-150 milliseconds after the blast.

Alternatively, the computer can calculate the proper inflation delay based on the details of the blast. In such a configuration, the inflatable device 76 includes sensors (not shown) for measuring characteristics such as location and magnitude of the blast. Based on these measurements, the computer calculates the effect of the blast on the vehicle 12 and instructs the airbag to inflate at a time when the vehicle 12 is calculated to be in the air.

With reference to FIGS. 2 and 3, the seat 10 can include a footrest 78 connected to the base 60 for supporting the feet of the occupant spaced from the floor 62 of the vehicle 12. The footrest 78 isolates the occupant from the floor 62 of the vehicle 12. Such a configuration prevents force from being transferred from the floor 62 of the vehicle 12 to the feet of the occupant.

With reference to FIG. 1, the seat 10 can include a seatbelt 80. FIG. 1 shows a five-point seatbelt for exemplary purposes, but the seatbelt 80 can be of any kind, such as, for example, a three-point seatbelt, without departing from the nature of the present invention. The seatbelt 80 is self-contained on the seat 10. In other words, the seatbelt 80 is anchored to the seat 10, e.g., the seat back frame 18 and/or the seat bottom frame 20 thereby eliminating the need for anchoring the seatbelt 80 to the vehicle body or floor 62. As such, as set forth above, the entire seat 10 can be installed into or removed from the vehicle 12 by merely disconnecting the base 60 from the vehicle 12, i.e., without the need for disconnecting the seatbelt 80 from the vehicle 12, so that the seat 10 is modular.

An anti-submarine feature 82 can be coupled to the seat bottom frame 20 to provide resistance to "submarining" of the occupant during a blast, i.e., to prevent the occupant from moving forward on the seat bottom 14 and sliding underneath the seatbelt 80. The anti-submarine feature typically includes a thigh support 42 pivotally coupled to the seat bottom frame 20. In a scenario where the blast causes the occupant to move forward and/or downwardly in the seat 10, force applied to the thigh support 42 by thighs of the occupant causes the thigh support 42 to rotate to prevent further forward movement of the occupant.

Figure 9:
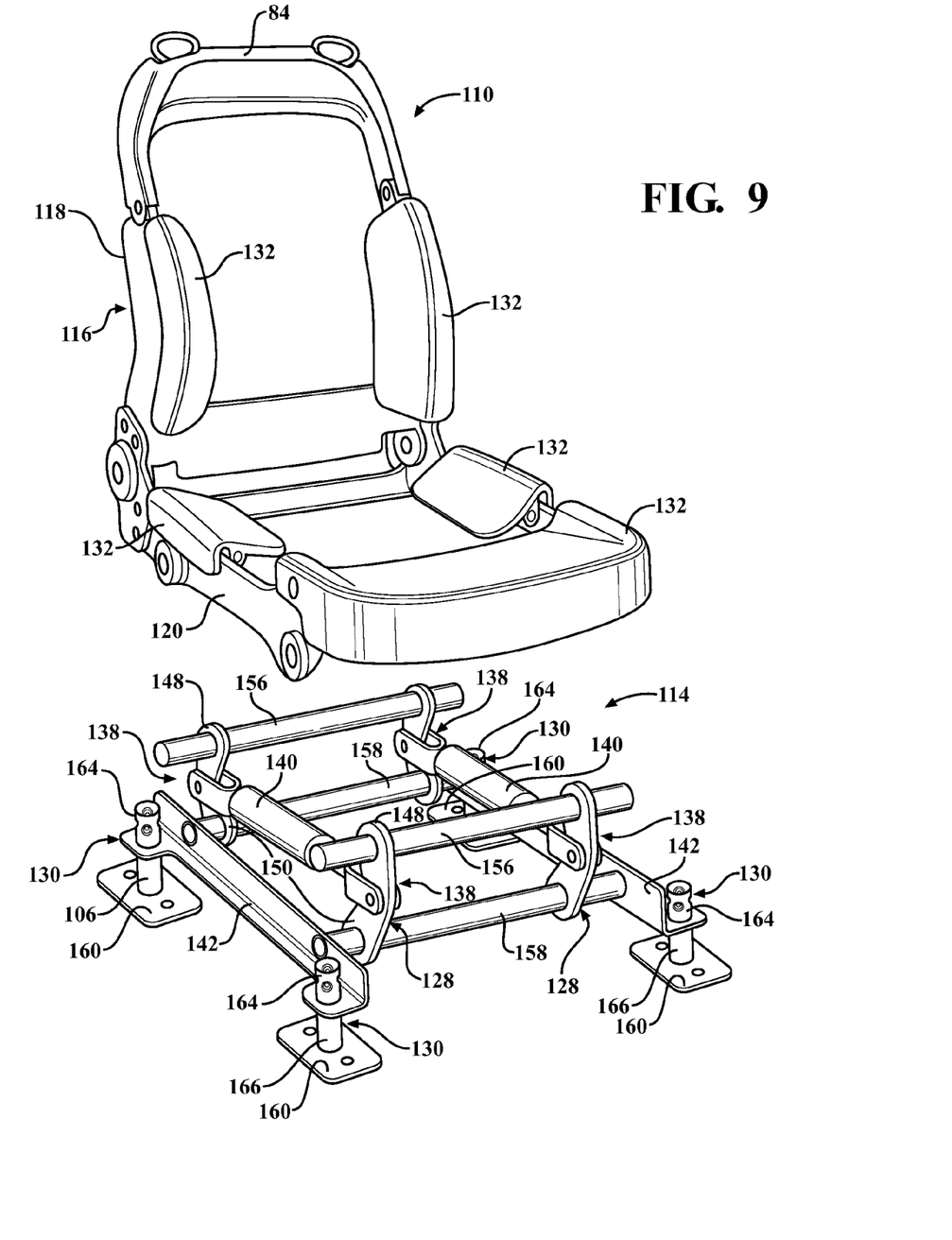
FIG. 9 is a partially exploded view of a seat of a second embodiment.

FIGS. 1-8 show a first embodiment of the seat 10 and FIG. 9 shows a second embodiment of the seat 110. Features of the second embodiment that are similar to features of the first embodiment are identified with the reference numeral of the first embodiment preceded by a "1." In the second embodiment, the seat bottom 114 and the seat back 116 each include a plurality of pans 132. The pans 132 are rotated and/or translated when the first energy absorbing device 26 is activated. The seat 10 of the second embodiment also includes an active head restraint 84. The active head restraint 84 is typically pivotally coupled to the seat back frame 18. In the scenario where the occupant is pushed back into the seat 10, e.g., during a blast, the active head restraint 84 pivots forwardly toward the head of the occupant to reduce the whiplash of the occupant.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A device for supporting an occupant of a vehicle and absorbing a force between the occupant and the vehicle created by relative movement between the occupant and the vehicle, said device comprising:

a frame;

said frame including a first energy absorbing device for absorbing at least a portion of the force when the force reaches a first magnitude;

said frame including a second energy absorbing device for absorbing at least a portion of the force when the force reaches a second magnitude greater than the first magnitude;

said second energy absorbing device coupled to said first energy absorbing device so that said first energy absorbing device transmits a portion of the force to said second energy absorbing device when the force reaches the second magnitude; and a third energy absorbing device coupled to said second energy absorbing device for absorbing a portion of the force from the second energy absorbing device when the force reaches a third magnitude greater than the second magnitude;

wherein said third energy absorbing device is configured to plastically deform to absorb at least a portion of the force when the force exceeds the third magnitude.

2. The device as set forth in claim 1 wherein said second energy absorbing device extends between said first energy absorbing device and said third energy absorbing device.

3. The device as set forth in claim 1 wherein said third energy absorbing device supports said second energy absorbing device so that said second energy absorbing device transmits a portion of the force to said third energy absorbing device when the force reaches the third magnitude.

4. The device as set forth in claim 1 wherein said first energy absorbing device and said second energy absorbing device each resiliently move when absorbing at least a portion of the force.

5. The device as set forth in claim 1 wherein said first energy absorbing device includes a pan with a first resilient member disposed between said frame and said pan.

6. The device as set forth in claim 5 further comprising a support spaced from said frame with said second energy absorbing device coupled to said frame and said support.

7. The device as set forth in claim 6 further comprising a base for connection to the vehicle with the third energy absorbing device supporting said support on said base.

8. The device as set forth in claim 7 wherein said third energy absorbing device extends between said base and said second energy absorbing device and wherein said second energy absorbing device extends between said third energy absorbing device and said first energy absorbing device.

9. The device as set forth in claim 7 wherein said third energy absorbing device extends from said base to said support and wherein said second energy absorbing device extends from said support to said frame.

10. The device as set forth in claim 1 wherein said second energy absorbing device supports said first energy absorbing device so that said first energy absorbing device transmits a portion of the force to said second energy absorbing device when the force reaches the second magnitude.

\* \* \* \* \*